US012128435B2

(12) United States Patent
Smith

(10) Patent No.: US 12,128,435 B2
(45) Date of Patent: Oct. 29, 2024

(54) WATER FOUNTAIN AND JET APPARATUS

(71) Applicant: COOL TECH USA LLC, Spring, TX (US)

(72) Inventor: Brent Allen Smith, Spring, TX (US)

(73) Assignee: COOL TECH USA LLC, Spring, TX (US)

( * ) Notice: Subject to any disclaimer, the term of this patent is extended or adjusted under 35 U.S.C. 154(b) by 343 days.

(21) Appl. No.: 17/864,167

(22) Filed: Jul. 13, 2022

(65) Prior Publication Data

US 2023/0017947 A1 Jan. 19, 2023

Related U.S. Application Data

(60) Provisional application No. 63/221,627, filed on Jul. 14, 2021.

(51) Int. Cl.
*B05B 17/08* (2006.01)
*E04H 4/16* (2006.01)

(52) U.S. Cl.
CPC ............. *B05B 17/08* (2013.01); *E04H 4/169* (2013.01)

(58) Field of Classification Search
CPC ................................ B05B 17/08; E04H 4/169
USPC .................................. 239/17, 275, 282, 565
See application file for complete search history.

(56) References Cited

U.S. PATENT DOCUMENTS

| | | | |
|---|---|---|---|
| 3,577,571 | A | 5/1971 | Bellinson et al. |
| 3,722,816 | A | 3/1973 | Stewart et al. |
| 3,831,852 | A | 8/1974 | Stillman, Jr. |
| 4,936,506 | A | 6/1990 | Ryan |
| 8,522,372 | B1 | 9/2013 | Lafon et al. |
| 2004/0069860 | A1 | 4/2004 | Nary |
| 2015/0337553 | A1 | 11/2015 | Kennedy |
| 2021/0079675 | A1 | 3/2021 | Goodwin |

FOREIGN PATENT DOCUMENTS

WO WO2017184034 A3 4/2016

*Primary Examiner* — Christopher S Kim
(74) *Attorney, Agent, or Firm* — Quisenberry Law PLLC

(57) ABSTRACT

A fountain apparatus may include a wall insert that can be threadably attached to a water inlet port in the wall of a pool. The wall insert may split water flow into two streams, one that passes through a jet nozzle ball and into the pool, and the other that flows into a reservoir that supplies water to a stream nozzle tip to form a water fountain. A water insert reservoir cap may be releasably engageable with the wall insert and include two fluid passageways, one corresponding to the flow path to the jet nozzle ball and the other corresponding to the reservoir and the flow path to the stream nozzle tip. A reservoir locking cap may be used to secure the wall insert reservoir cap to the wall insert. A jet nozzle cap may be used to secure the jet nozzle ball to the reservoir locking cap.

20 Claims, 6 Drawing Sheets

FIG. 1A
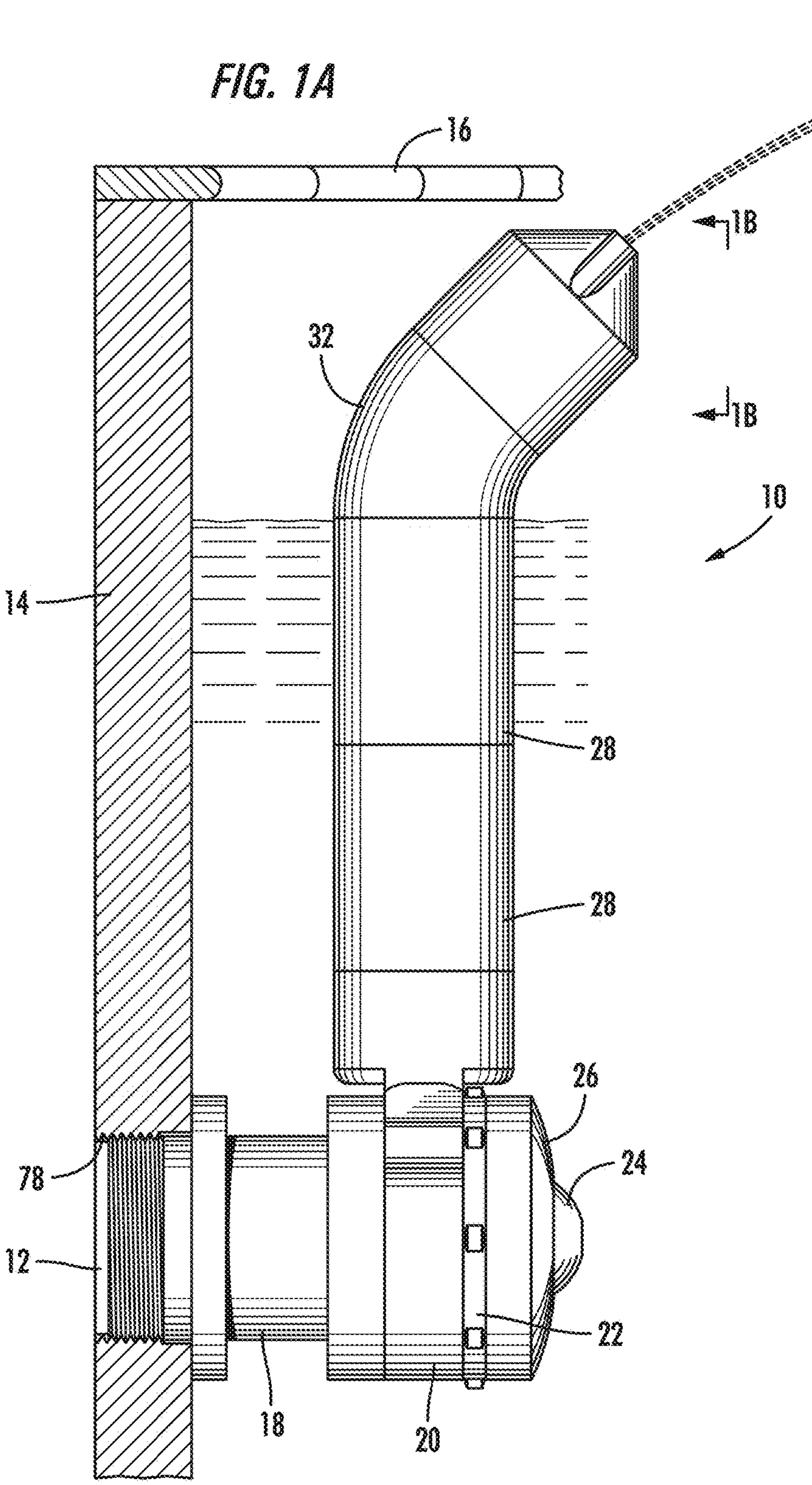
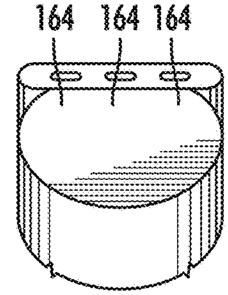
FIG. 1B

FIG. 4A
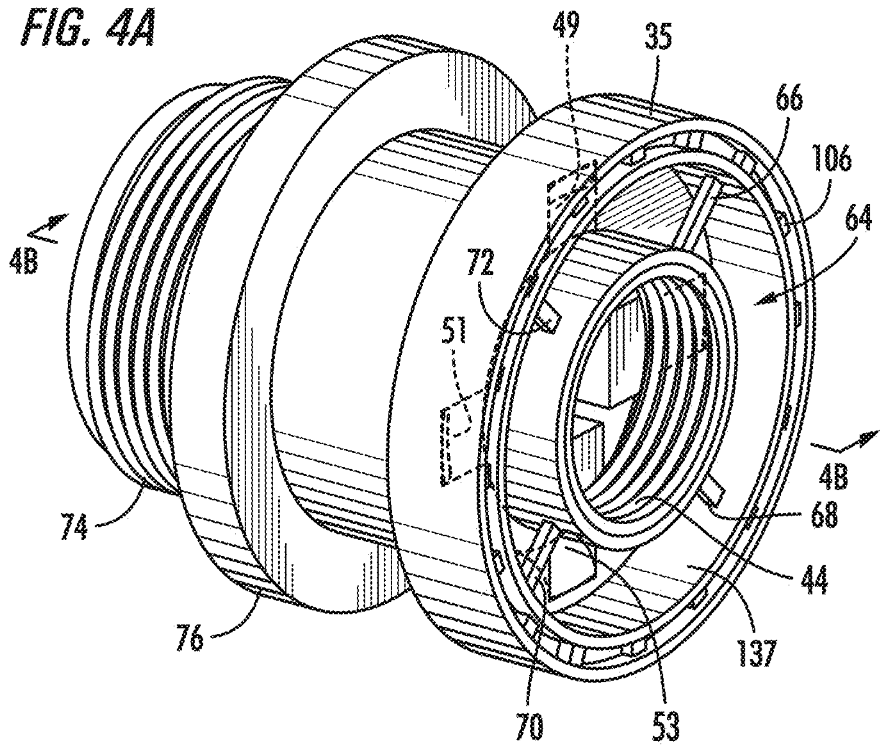
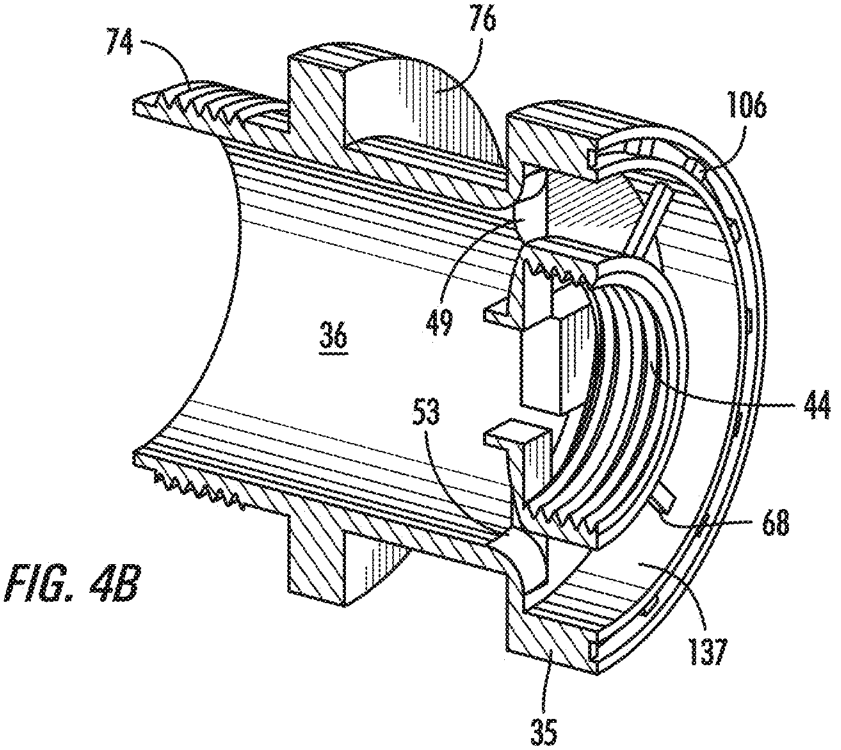
FIG. 4B

WATER FOUNTAIN AND JET APPARATUS

RELATED APPLICATIONS

This application claims the benefit of U.S. Provisional Application No. 63/221,627, filed Jul. 14, 2021, the contents of which are fully incorporated herein by reference.

BACKGROUND OF THE INVENTIONS

1. Field of the Inventions

The present inventions generally pertain to water fountains, such as for use in swimming pools, spas or hot tub, and more particularly to devices and related methods that use an inlet water source that flows into a body of water to generate a fountain that sprays above and into the body of water and also direct water jet flow into the body of water to induce water circulation therein. The present inventions are most applicable to swimming pools, hot tubs, and spas in general but are not limited to such applications.

2. Description of the Related Art

Many pool owners want to add a fountain to their pool, such as to provide a fountain that sprays water in an arc over the pool surface for enjoyment with the added benefit of the sound and visual effects of water cascading onto the surface of the water which can provide a soothing and calming effect on the viewer, and also lower the water temperature in the pool. The source of pressurized water for the fountain is either one of the water inlet jets, or some external water source. The pressurized water source is used to create a spray of water from a fountain nozzle while keeping the functionality of the inlet water jet into the pool as designed.

Inlet water sources are not designed to provide pressurized water for circulation and fountain distribution at the same time. Existing designs do not address methods to create this fountain functionality while keeping the inlet jets functionality in the same location and plane.

Typically, a fountain must be planned for and designed into a new pool build. This requires additional piping and connections that drive up the cost substantially and creates potential repair issues in the future if there is a failure of the plumbing system. An example might be a leak at a joint. The cost to make this repair will be expensive and time consuming. To retrofit an existing pool in general is very expensive based on the cost for excavation, adding or tapping into an existing supply line, removal and replacement of pool surrounds and adding the discharge jet to the pool wall. In addition to the expense, the pool will be out of service until construction is completed. Simply adding a pipe to power the fountain and remove the existing inlet jet is not a good solution as this may cause potential water quality issues which can lead to health issues with swimmers.

When a pool is designed, water circulation is a big concern. Water inlet jets are positioned in specific locations with an intended design for water circulation. Furthermore, pool designers generally hold cost down by installing a few jets to meet water circulation requirements. Removal of a water jet to power a fountain would alter the design and functionality of the water circulation system. Water circulation is important in keeping the pool clean, creating cavitation for mixing of chemicals when added and moving water around the pool toward skimmers to remove surface debris in general. As such, removal of a water inlet jet from the circulation system to power a fountain creates potential water quality issues that can create health issues for swimmers.

Fountains are not new and there are several patents associated with their art. However, most fountain solutions are either designed in the original pool build or are very expensive retrofits. For example, U.S. Pat. No. 3,722,816 discloses a fountain installed in the floor of the pool. U.S. Pat. No. 3,577,571 discloses discharge heads around a pool that are imbedded into the pool wall with quick disconnects. U.S. Pat. No. 3,831,852 discloses incasement of nozzles around pool edge. U.S. Pat. No. 4,936,506 discloses a swimming pool fountain. U.S. Pat. No. 8,522,372 discloses an illuminated pool fountain system. U.S. Patent Application Publication No. 2004/0069860 discloses a pool fountain. U.S. Patent Application Publication No. 2015/0337553 discloses a water fountain return fitting for swimming pools and spas. U.S. Patent Application Publication No. 2021/0079675 discloses a flexible pool fountain system. WO2017184034 A3 discloses a wall inlet and safe, flexible valveless swimming pool fountain. All of these are expensive, time consuming to install in general, require substantial cost to retro fit these same concepts, fail to provide a simple low-cost solution that provides a pool fountain and keeps the existing inlet water jet, and/or are distinguishable for other reasons as will become apparent from the following description.

As will become evidence from the below description, the present inventions solve the above problem and will meet the needs of the pool owner in a cost effective, Do-it-yourself fountain, while at the same time keeping the functionality of the water inlet jet in the same position as the original pool construction. It will be further noted that a fountain device according to the present inventions can be added at each pool inlet jet location without disrupting the pool circulation system as originally designed.

SUMMARY OF THE INVENTIONS

In one aspect, the present inventions provide a swimming pool fountain that produces a spray of water above the pool surface, and can be used in new and existing pools whether in-ground or above ground while addressing the issues mentioned above associated with using a pool water inlet jet to power the fountain. In one aspect, a fountain apparatus according to the present inventions may connect to any existing inlet water jet in a pool, spa, or hot tub in an in-ground installation or above-ground setting. According to another aspect of the present inventions, a fountain apparatus can be adjusted in height to penetrate the pool surface regardless of the position of the inlet water jet and height of water in the pool. In another aspect of the present inventions, a fountain apparatus can be directed in any 360-degree direction including spray height. In another aspect of the present inventions, a fountain apparatus may comprise an assembly that is small in footprint, and may be attached directly to an inlet water source located on a pool wall, which provides a rigid structure for stability. Benefits of this low profile in conjunction with attachment to the pool wall structure at the inlet water flange may include minimizing contact with people, minimizing contact with cleaning equipment, which will therefore minimize damage to the assembly and potential hazards to people. There are no loose pipes or conduits associated with the present inventions that might be floating in the water and that might create an opportunity for entanglement leading to damage of equipment and potential harm to swimmers in the pool. In another aspect of the present inventions, a fountain apparatus may include a lighting system in conjunction with spray nozzles that can add color to each stream of water via an encapsulated spray nozzle that allows for fiber optics, LED's or other lighting sources necessary to produce color into the streams of water or through a transparent spray nozzle.

In another aspect, the present inventions may include a fountain apparatus comprising: a wall insert including a cylindrical body member having a first end and second end, an internal cylindrical housing within the body member adjacent a second end of the body member, a central fluid flow path extending from the first end of the body member through the internal cylindrical housing to the second end of the body member, and a fluid passageway extending from the central fluid flow path to the second end of the body member through a space defined by an outer surface of the internal cylindrical housing and an inner surface of the body member; a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert; a reservoir locking cap having a cylindrical body member having an inner bore, the cylindrical body member being adapted to be received within the internal bore of the internal cylindrical wall of the wall insert reservoir cap, a first end of the cylindrical body member being adapted for threadable engagement with the internal cylindrical housing in the wall insert and with the inner bore of the cylindrical body member of the reservoir locking cap in fluid communication with the central fluid flow path in the wall insert; a jet nozzle ball having an annular body including an internal fluid passageway leading from a first end of the annular body to a second end of the annular body, the first end of the annular body being adapted for engagement within a second end of the cylindrical body member on the reservoir locking cap; a jet nozzle cap having a central aperture adapted to receive the second end of the annular body on the jet nozzle ball, the jet nozzle cap being adapted for threadable engagement with a second end of the cylindrical body member on the reservoir locking cap; and a stream nozzle tip including an angled body member, the angled body member including an internal fluid flow path therethrough extending from a first end of the angled body member to a second end of the angled body member, the first end of the angled body member being adapted for mating engagement with the upper end of the upper housing on the wall insert reservoir cap, and the angled body member including at least one exit jet port adjacent the second end of the angled body member. Another feature of this aspect of the present inventions may be that the fountain apparatus may further include at least one riser attachment having a cylindrical body having a longitudinal passageway therethrough, the at least one riser attachment being adapted for connection between the wall insert reservoir cap and the stream nozzle tip, a first end of the at least one riser attachment being adapted for mating engagement with the upper end of the upper housing on the wall insert reservoir cap with the longitudinal passageway through the at least one riser attachment in fluid communication with the second fluid passageway through the wall insert reservoir cap, and a second end of the at least one riser attachment being adapted for mating engagement with the first end of the angled body member. Another feature of this aspect of the present inventions may be that the fountain apparatus may further include at least one water port diverter disposed within the cylindrical body member of the wall insert and supported by the internal cylindrical housing in the wall insert. Another feature of this aspect of the present inventions may be that the at least one water port diverter includes a ramp surface angled downwardly away from the first end of the cylindrical body member of the wall insert and toward an internal bore of the cylindrical body member of the wall insert. Another feature of this aspect of the present inventions may be that the at least one water port diverter includes a U-shaped side wall. Another feature of this aspect of the present inventions may be that the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert. Another feature of this aspect of the present inventions may be that the upper housing includes an annular recess in the upper end of the upper housing, and wherein an annular wall extending from a first end of the at least one riser attachment is adapted for mating engagement with the annular recess in the upper end of the upper housing. Another feature of this aspect of the present inventions may be that an inner surface of the annular wall includes an annular ridge adapted for mating engagement with an annular groove in the annular recess in the upper end of the upper housing. Another feature of this aspect of the present inventions may be that the space in the wall insert is an annular space and the space in the wall insert reservoir cap is an annular space and the two annular spaces are aligned with each other when the wall insert is engaged with the wall insert reservoir cap.

In another aspect, the present inventions may include a fountain apparatus comprising: a wall insert including a cylindrical body member having a first end and second end, an internal cylindrical housing within the body member adjacent a second end of the body member, a central fluid flow path extending from the first end of the body member through the internal cylindrical housing to the second end of the body member, and a fluid passageway extending from the central fluid flow path to the second end of the body member through a space defined by an outer surface of the internal cylindrical housing and an inner surface of the body member; a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert; a reservoir locking cap having a cylindrical body member having an inner bore, the cylindrical body member being adapted to be received within the internal bore of the internal cylindrical wall of the wall insert reservoir cap, a first end of the cylindrical body member being adapted for threadable engagement with the internal cylindrical housing in the wall insert and with the inner bore of the cylindrical body member of the reservoir locking cap in fluid communication with the central fluid flow path in the wall insert; a jet nozzle ball having an annular body including an internal fluid passageway leading from a first end of the annular body to a second end of the annular body, the first end of the annular body being adapted for engagement within a second end of the cylindrical body member on the reservoir locking cap; a jet nozzle cap having a central aperture adapted to receive the second end of the annular body on the jet nozzle ball, the jet nozzle cap being adapted for threadable engagement with a second end of the cylindrical body member on the reservoir locking cap; at least one riser attachment having a cylindrical body having a longitudinal passageway therethrough, a first end of the at least one riser attachment being adapted for mating engagement with the upper end of the upper housing on the wall insert reservoir cap with the longitudinal passageway through the at least one riser attachment in fluid communication with the second fluid passageway through the wall insert reservoir cap; and a stream nozzle tip including an angled body member, the angled body member including an internal fluid flow path therethrough extending from a first end of the angled body member to a second end of the angled body member, the first end of the angled body member being adapted for mating engagement with a second end of the at least one riser attachment, and the angled body member including at least one exit jet port adjacent the second end of the angled body member. Another feature of this aspect of the present inventions may be that the fountain apparatus may further include at least one water port diverter disposed within the cylindrical body member of the wall insert and supported by the internal cylindrical housing in the wall insert. Another feature of this aspect of the present inventions may be that the at least one water port diverter includes a ramp surface angled downwardly away from the first end of the cylindrical body member of the wall insert and toward an internal bore of the cylindrical body member of the wall insert. Another feature of this aspect of the present inventions may be that the at least one water port diverter includes a U-shaped side wall. Another feature of this aspect of the present inventions may be that the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert. Another feature of this aspect of the present inventions may be that the upper housing includes an annular recess in the upper end of the upper housing, and wherein an annular wall extending from a first end of the at least one riser attachment is adapted for mating engagement with the annular recess in the upper end of the upper housing. Another feature of this aspect of the present inventions may be that an inner surface of the annular wall includes an annular ridge adapted for mating engagement with an annular groove in the annular recess in the upper end of the upper housing. Another feature of this aspect of the present inventions may be that the space in the wall insert is an annular space and the space in the wall insert reservoir cap is an annular space and the two annular spaces are aligned with each other when the wall insert is engaged with the wall insert reservoir cap.

In another aspect, the present inventions may include a fountain apparatus comprising: a wall insert including a cylindrical body member having a first end and second end, an outer surface of the first end of the cylindrical body member including male threads, an internal cylindrical housing within the body member adjacent a second end of the body member, the internal cylindrical housing including a threaded bore, a central fluid flow path extending from the first end of the body member through the internal cylindrical housing to the second end of the body member, a fluid passageway extending from the central fluid flow path to the second end of the body member through a space defined by an outer surface of the internal cylindrical housing and an inner surface of the body member, and at least one water port diverter disposed within the cylindrical body member and supported by the internal cylindrical housing; a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert; a reservoir locking cap having a cylindrical body member having an inner bore, the cylindrical body member being adapted to be received within the internal bore of the internal cylindrical wall of the wall insert reservoir cap, a first end of the cylindrical body member having male threads on an outer surface thereof adapted for threadable engagement with the threaded bore on the internal cylindrical housing in the wall insert, the inner bore of the cylindrical body member of the reservoir locking cap being adapted for alignment with and fluid communication with the central fluid flow path in the wall insert, an outer surface of a second end of the cylindrical body member including male threads; a jet nozzle ball having an annular body including an internal fluid passageway leading from a first end of the annular body to a second end of the annular body, the first end of the annular body being adapted for engagement within a second end of the cylindrical body member on the reservoir locking cap; a jet nozzle cap having a central aperture adapted to receive the second end of the annular body on the jet nozzle ball, the jet nozzle cap including internal female threads adapted for threadable engagement with the male threads on the second end of the cylindrical body member on the reservoir locking cap; and a stream nozzle tip including an angled body member, the angled body member including an internal fluid flow path therethrough extending from a first end of the angled body member to a second end of the angled body member, the first end of the angled body member being adapted for mating engagement with the upper end of the upper housing on the wall insert reservoir cap, and the angled body member including at least one exit jet port adjacent the second end of the angled body member. Another feature of this aspect of the present inventions may be that the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert. Another feature of this aspect of the present inventions may be that the space in the wall insert is an annular space and the space in the wall insert reservoir cap is an annular space and the two annular spaces are aligned with each other when the wall insert is engaged with the wall insert reservoir cap.

Other features, aspects and advantages of the present inventions will become apparent from the following discussion and detailed description.

BRIEF DESCRIPTION OF THE DRAWINGS

FIG. 1A is a side view of a fountain apparatus according to the present inventions installed in communication with an inlet water source in the side of a water containing structure, such as a swimming pool, spa, or hot tub, for example.

FIG. 1B is a front view of an upper portion of the fountain apparatus shown in FIG. 1A.

FIG. 4A is a perspective view of a component of the fountain apparatus as indicated in FIGS. 3A, 3C and 3D.

FIG. 4B is a sectional view of the component as illustrated in FIG. 4A.

Figure 2B:
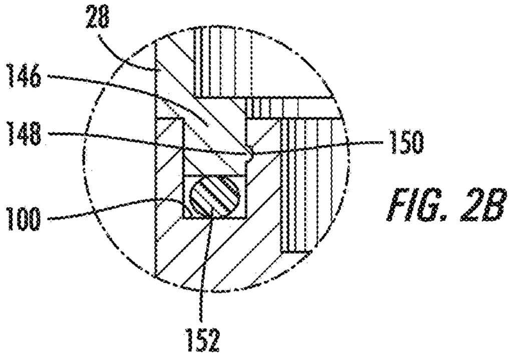
FIG. 2B is an enlarged view of the encircled portion of the fountain apparatus shown in FIG. 2A.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Referring to the drawings in detail, wherein like numerals denote identical elements throughout the several views, and referring initially to FIG. 1, there is shown a side view of a fountain apparatus 10 engaged with an inlet water port 12 disposed in a wall 14 of a pool 16. The pool 16 may be any structure that holds a body of water, including but not limited to a swimming pool, a spa, a hot tub, or other structures that can hold water for entertainment purposes that may use or need a fountain. The inlet water port 12 is in fluid communication with an inlet water source, which may be any pressurized water source that provides a flow of water into the pool of water 16, such as part of a filtration system, or any external source such as a garden hose or pipe which can be temporarily or permanently attached to the fountain apparatus 10 as a source of pressurized water. Any fluid or compressed air as a medium can be used. An example would be an aeration system by compressed air for a fish tank or a distribution system requiring a broad disbursement of any liquid or other fluid substances such as liquid fertilizer in a garden or nursery. In a typical pool installation, the pressurized water source is piped underground to the pool. A connection flange is inserted from pool side, through the pool wall material, to the pressurized water source. Next is the actual pool jet that is connected to the flange to create the exit point of water into the pool.

Figure 2A:
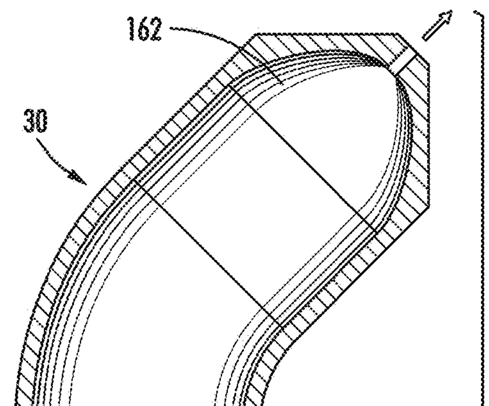
FIG. 2A is a cross-sectional side view of the fountain apparatus shown in FIG. 1A.
Figure 2A:
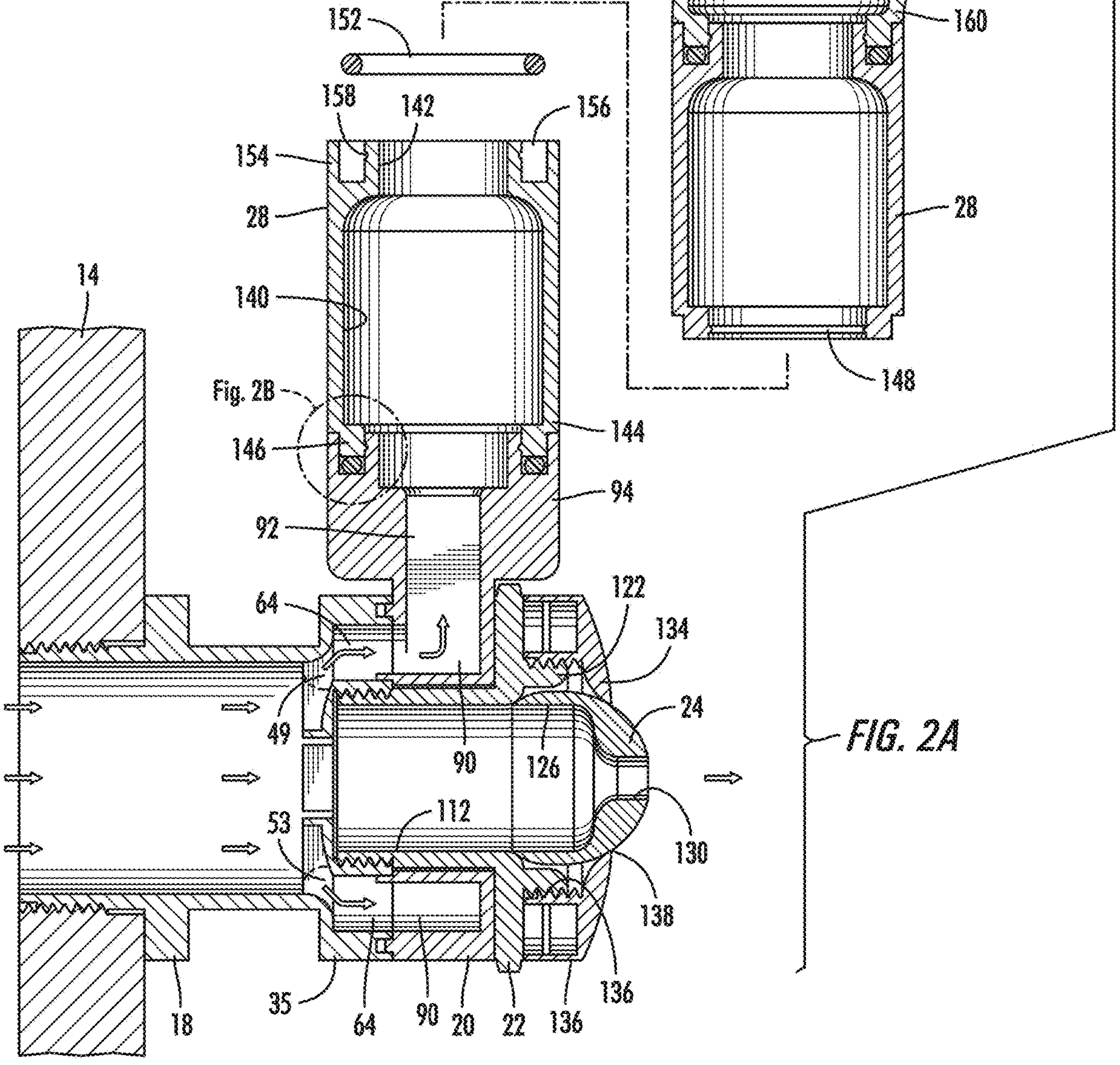

With reference to FIGS. 1-3, in a specific embodiment, the fountain apparatus 10 may include the following components: (1) a wall insert 18; (2) a wall insert reservoir cap 20; (3) a reservoir locking cap 22; (4) an inlet jet nozzle ball 24; (5) a jet nozzle cap 26; (6) at least one riser attachment 28; and (7) a stream nozzle tip 30. In a specific embodiment, the fountain apparatus 10 may also include an angled riser attachment 32 connected between the at least one riser attachment 28 and the stream nozzle tip 30. In a specific embodiment, the fountain apparatus 10 may not include any riser attachments 28, in which case the stream nozzle tip 30 or angled riser attachment 32 may be connected directly to the wall insert reservoir cap 20, as discussed in more detail below.

Figure 3A:
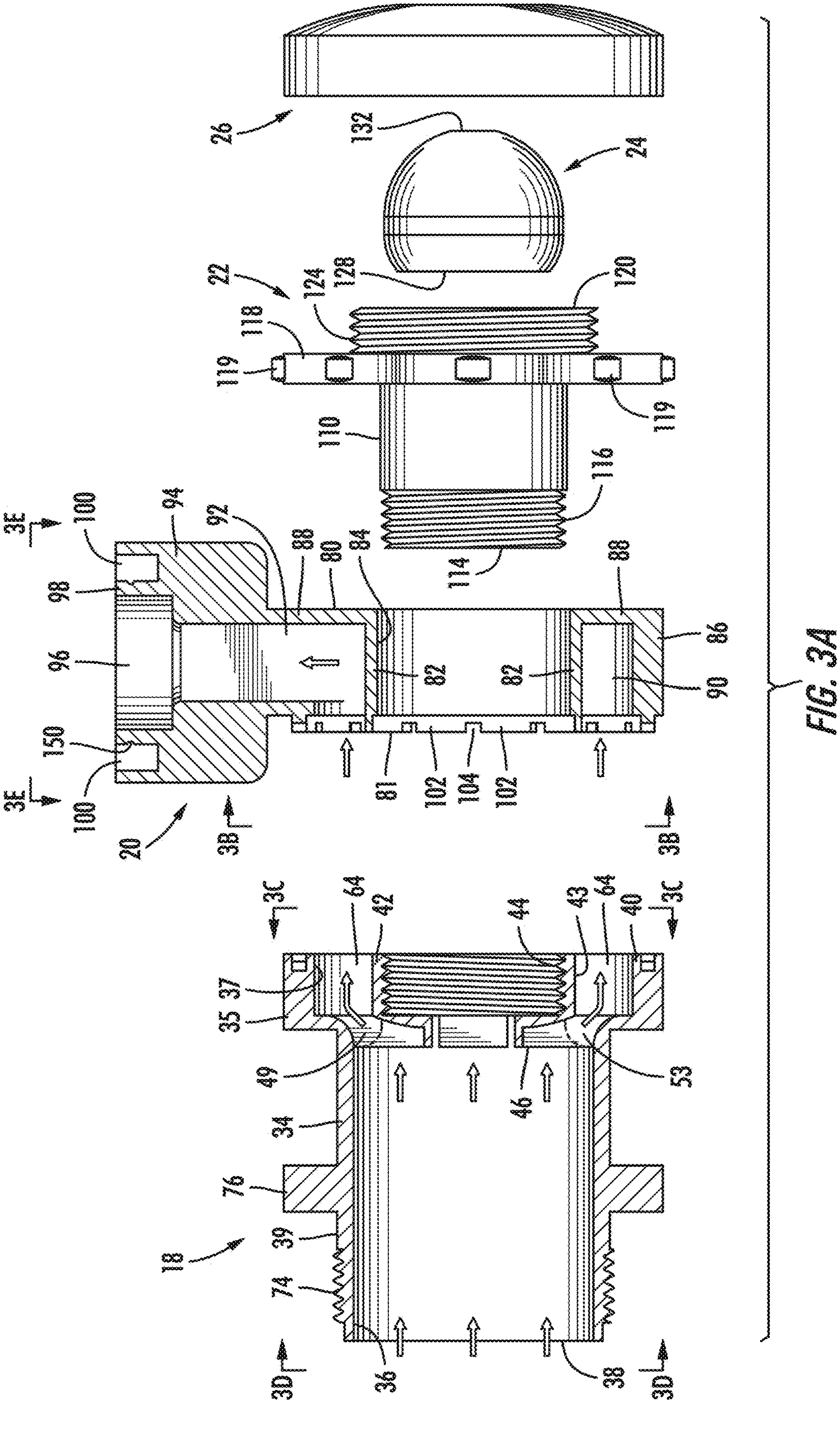
FIG. 3A is an exploded side view of the lower portions of the fountain apparatus shown in FIGS. 1A and 2A.

With reference to the left side of FIG. 3A, the wall insert 18 may include a cylindrical body member 34 having an internal bore 36 extending from a first end 38 of the body member 34 toward a second end 40 of the body member 34. The body member 34 may include an outer flange 35 disposed adjacent the second end 40 of the body member 34. The outer flange 35 may include an internal flange bore 37. The body member 34 may include an internal cylindrical housing or ring 42 extending from the second end 40 of the body member 34 toward the internal bore 36 of the body member 34. The internal cylindrical housing 42 includes a threaded bore 44 leading from the second end 40 of the body member 34 towards an internal end 46 of the internal cylindrical housing 42. The internal bore 36 and the threaded bore 44 form a central fluid flow path from the first end of the body member 34 to the second end 40 of the body member 34.

The internal end 46 of the internal cylindrical housing 42 may include a plurality of water port diverters 48, 50, 52 and 54 that may be attached to the internal bore 36 of the body member 34 and adjacent the internal end 46 of the internal cylindrical housing 42 in a general North, East, South and West alignment. Each of the water port diverters 48, 50, 52, and 54 may include ramp surfaces 56, 58, 60, and 62, respectively, that may be angled downwardly away from the first end 38 of the body member 34 toward the internal bore 36 of the body member 34. A first annular space 64 is disposed between an outer surface 43 of the internal cylindrical housing 42 and the internal flange bore 37 of the outer flange 35. Each of the water port diverters 48, 50, 52 and 54 are adapted to direct a portion of pressurized water flow from the internal bore 36 of the body member 34 through fluid passageways 49, 51, 53, and 55 corresponding to the respective water port diverters 48, 50, 52, and 54 and into the first annular space 64 (and into a corresponding space within the wall insert reservoir cap 20 as discussed below). The fluid passageways 49, 51, 53, and 55 may extend between the central fluid flow path and the second end 40 of the body member 34 through a space between the internal cylindrical housing 42 and the body member 34. Each of the water port diverters 48, 50, 52, and 54 may include a corresponding U-shaped side walls 48*a*, 50*a*, 52*a*, and 54*a* to assist in diverting water into the passageways 49, 51, 53, and 55, respectively. The body member 34 may include a plurality of cross support braces 66, 68, 70 and 72 disposed within the first annular space 64 and connected between the outer surface 43 of the internal cylindrical housing 42 and the internal flange bore 37 of the outer flange 35. An outer surface 39 of the body member 34 adjacent the first end 38 of the body member 34 may be provided with male threads 74. The body member 34 may also include an outer support flange 76 disposed between the first end 38 and the second end 40 of the body member 34.

The male threads 74 around the first end 38 of the body member 34 are adapted for engagement with female threads 78 on the inlet water port 12 in the pool wall 14, as shown in FIG. 1A. After the existing pool jet is removed from the inlet water port 12, the wall insert 18 is threaded into the inlet water port 12 until the outer support flange 76 on the wall insert 18 is engaged against the pool wall 14. This creates a stable and rigid connection point in the pool. One of the benefits of the present inventions is that removal of the existing pool jet and replacing it with the wall insert 18 is user friendly and easily performed by a homeowner.

Figure 3B:
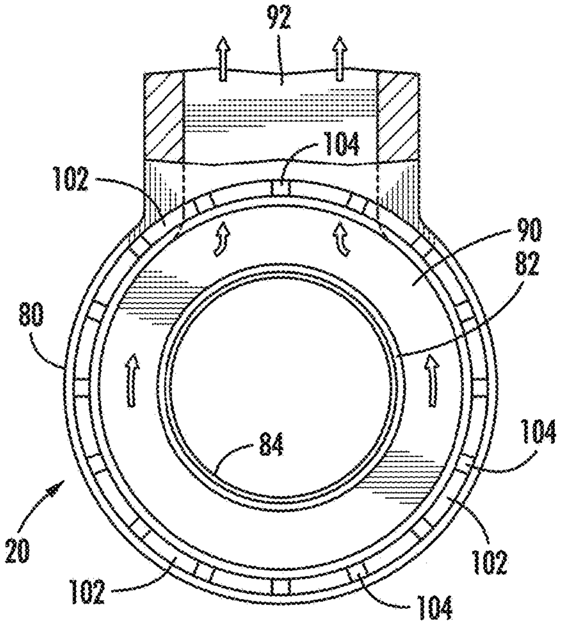
FIG. 3B is a front, elevation view of a component of the fountain apparatus as indicated in FIG. 3A.

Referring now to FIGS. 3A and 3B, the wall insert reservoir cap 20 may include an annular body member 80 having an internal cylindrical wall 82 having an internal bore 84. The annular body member 80 may further include an outer annular wall 86 and a back annular wall 88. In a specific embodiment, the outer annular wall 86, the back annular wall 88, and the internal cylindrical wall 82 combine to form a second annular space 90 to form a reservoir in combination with the first annular space 64 in the wall insert 18, as more fully discussed elsewhere herein. An upper end of the outer annular wall 86 may include a longitudinal passageway 92 that leads to an upper housing 94 that may be part of the wall insert reservoir cap 20. The passageway 92 may lead to an opening 96 within the upper housing 94 that may be adjacent an upper end 98 of the upper housing 94. The upper housing 94 may include an annular recess 100 disposed in the upper end 98 of the upper housing 94, the purpose of which will be described below.

Figure 3C:
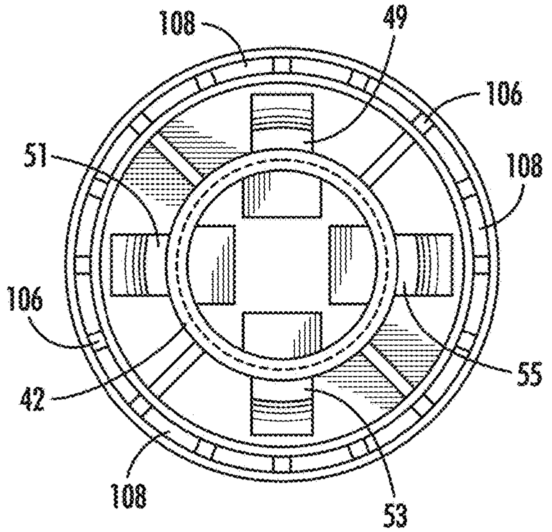
FIG. 3C is a rear, elevation view of a component of the fountain apparatus as indicated in FIG. 3A.
Figure 3D:
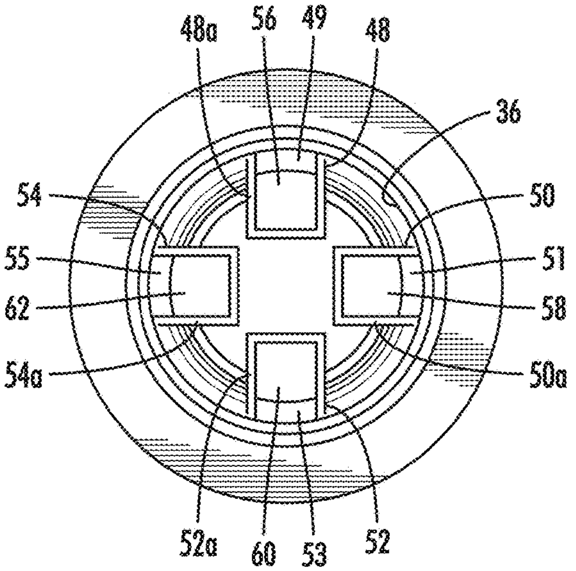
FIG. 3D is a front, elevation view of a component of the fountain apparatus as indicated in FIG. 3A.
Figure 3E:
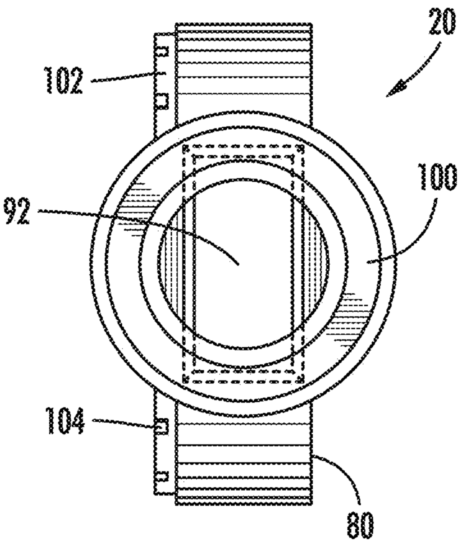
FIG. 3E is a top view of a wall insert reservoir cap that may form part of a fountain apparatus according to the present inventions.
Figure 5:
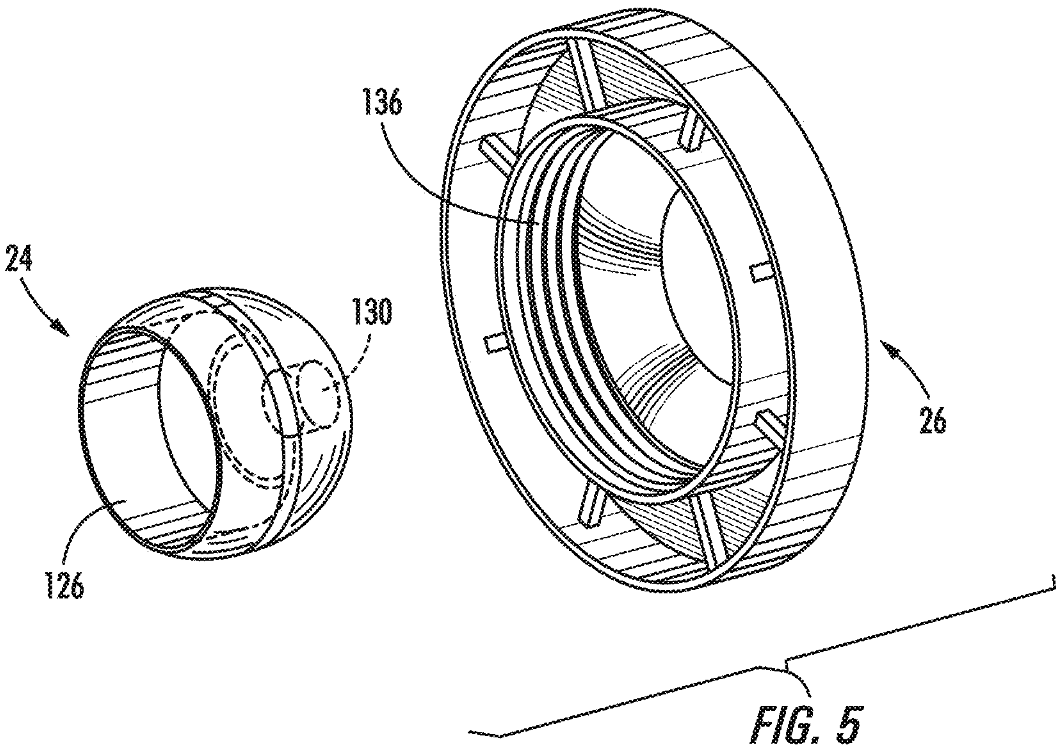
FIG. 5 is a perspective view of a jet nozzle ball and a jet nozzle cap that may form part of a fountain apparatus according to the present inventions.

A first end 81 of the annular body member 80 on the wall insert reservoir cap 20 may include a plurality of teeth 102 that are separated by recesses 104 and are disposed in an annular pattern around the outer periphery of the first end 81 of the annular body member 80, as best shown in FIG. 3B. Similarly, as best shown in FIG. 3C, the second end 40 of the wall insert 18 may include a plurality of teeth 106 that are separated by recesses 108 and are disposed in an annular pattern around the outer periphery of outer flange 35 on the second end 40 of the wall insert 18. It is noted that the teeth 102 on the wall insert reservoir cap 20 are sized to mate with the recesses 108 on the wall insert 18, and the teeth 106 on the wall insert 18 are sized to mate with the recesses 104 on the wall insert reservoir cap 20. The teeth 102 and recesses 104 on the wall insert reservoir cap 20 are adapted for mating engagement with the corresponding recesses 108 and teeth 106 on the wall insert 18 when the wall insert 18 and wall insert reservoir cap 20 are engaged with one another, such as shown in FIG. 2A. This allows for locking of the wall insert 18 and the wall insert reservoir cap 20 to each other to prevent relative rotation between those two components. When the components are being assembled, the user can position the wall insert reservoir cap 20 in its desired angular position relative to the wall insert 18 (which has been rigidly secured to the inlet water port 12 and pool wall 14) before the two parts are placed into mating engagement with each other in the manner as explained above. In this manner, the user can select the desired position of where the stream nozzle tip 30 will exit above the pool water surface, as will become apparent from additional details discussed below.

With reference to FIGS. 2A and 3A, the reservoir locking cap 22 may include a cylindrical body member 110 having an inner bore 112. A first end 114 of the body member 110 may include male threads 116 disposed around an outer surface of the body member 110 adjacent the first end 114 of the body member 110. The body member 110 may include an outer flange 118 disposed between the first end 114 of the body member 110 and a second end 120 of the body member 110. The outer flange 118 may include gripping nubs 119, the purpose of which will be discussed below. The body member 110 may include an annular end wall 122 between the outer flange 118 and the second end 120 of the body member 110. The end wall 122 may include an inner bore having a diameter greater than diameter of the inner bore 112 to provide relief to receive the jet nozzle ball 24, as will be discussed below. In this manner, in a specific embodiment, the reservoir locking cap 22 may be mechanically designed to cradle the inlet jet nozzle ball 24, which is used to direct exiting pressurized water into the pool 16. An outer surface of the end wall 122 may include male nozzle threads 124, the purpose of which will be described below. The outer diameter of the male nozzle threads 124 on the second end 120 of the reservoir locking cap 22 may be greater than the outer diameter of the male threads 116 on the first end 114 of the reservoir locking cap 22.

As shown in FIGS. 2A and 3A, the cylindrical body member 110 on the reservoir locking cap 22 is adapted to be received within the internal bore 84 of the wall insert reservoir cap 20. When the components are being assembled, once the wall insert reservoir cap 20 is matingly engaged with the wall insert 18 in the manner described above, the cylindrical body member 110 on the reservoir cap 22 is inserted into the internal bore 84 of the wall insert reservoir cap 20 until the first end 114 of the reservoir locking cap 22 reaches the second end 40 of the wall insert 18. Using the gripping nubs 119 on the outer flange 118 of the reservoir locking cap 22, the reservoir locking cap 22 is rotated in a clockwise direction to cause the male threads 116 on the reservoir locking cap 22 to be threaded into engagement with the female threads 44 on the wall insert 18 until the outer flange 118 is resting against the back annular wall 88 on the wall insert reservoir cap 20 to firmly secure the wall insert reservoir cap 20 to the wall insert 18. When securely tightened, the wall insert 18 and the wall insert reservoir cap 20 are "locked" in place. One benefit of this locking, besides holding the wall insert 18 and the wall insert reservoir cap, is that the spray angle of the stream nozzle tip 30 is also locked in place according to the angle set by the pool owner.

Referring to FIGS. 2A and 3A, the inlet jet nozzle ball 24 includes an internal bore 126 that leads from a first end 128 of the inlet jet nozzle ball 24 into an exit orifice 130 adjacent a second end 132 of the inlet jet nozzle ball 24 and having a diameter smaller than the internal bore 126. The first end 128 of the inlet jet nozzle ball 24 is adapted to be received within the annular end wall 122 on the second end 120 of the reservoir locking cap 22, as best shown in FIG. 2A. In a specific embodiment, the internal bore 126 of the inlet jet nozzle ball 24 may be the same size as, and designed to align with, the inner bore 112 of the reservoir locking cap 22.

The inlet jet nozzle ball 24 is held in place by the jet nozzle cap 26. The jet nozzle cap 26 may include an annular body 134 including internal female threads 136 adapted for mating engagement with the male nozzle threads 124 on the annular end wall 122 of the reservoir locking cap 22. The jet nozzle cap 26 includes a central aperture 138 through which the second end 132 of the inlet jet nozzle ball 24 protrudes when the parts are assembled. The inlet jet nozzle ball 24 is designed to rotate in the same manner as the inlet jet that was removed from the existing pool to start the installation. The direction of water exiting the inlet jet nozzle ball 24 can be adjusted left, right, up or down at any desired angle to obtain the optimal flow to replicate the fit, form and function of the pre-existing pool jet that was removed at the start of the installation process.

In a specific embodiment, the jet nozzle cap 26 may be designed to lock the inlet jet nozzle ball 24 in the exact position selected by the pool owner. As described above, the jet nozzle cap 26 has a threaded portion that mates/attaches to the reservoir locking cap threads 124. By rotating the jet nozzle cap 26 in a clockwise direction, the threads of the jet nozzle cap 26 will tighten through mechanical compression with the reservoir locking cap threads 124. This will lock the inlet jet nozzle ball 24 in the desired position thus establishing the direction of pressurized water flow exiting the face of the jet. This is semi-permanent as the homeowner can change the position of the inlet jet nozzle ball 24 by rotating the jet nozzle cap 26 in a counterclockwise direction thus releasing the mechanical compression on the inlet jet nozzle ball 24, thereby allowing the inlet jet nozzle ball 24 to turn freely for adjustments. The homeowner can then retighten the jet nozzle cap 26 as described above.

The exit orifice 130 on the inlet jet nozzle ball 24 can be provided in various sizes depending on desired objectives and performance characteristics. By changing the size of the exit orifice 130, the pressurized water exiting the orifice 130 will increase or decrease as a result of the back pressure caused by different orifice sizes. Changing the orifice size will impact the cavitation of water at the exit point of the jet and increase or decrease the volume of water exiting the orifice into the pool. The change in orifice size will also impact the pressurized water that powers the fountain spray. This orifice size adjustment will allow for optimal fountain spray patterns that can be changed to address various pool sizes and designs.

The upper portion of the fountain apparatus 10 that extends upwardly from the wall insert reservoir cap 20 will now be described. This upper portion may be referred to as the fountain head assembly. With reference to FIG. 1A, in a specific embodiment, the fountain apparatus 10 may include a plurality of riser attachments 28. Each riser attachment 28 may include a cylindrical body having a longitudinal passageway therethrough defined by a first bore 140 and a second bore 142. In a specific embodiment, the diameter of the first bore 140 may be greater than the diameter of the second bore 142. The first bore 140 may extend from a first end 144 of the riser attachment 28. The first end 144 of the riser attachment 28 may include an indented annular wall 146 extending outwardly away from the first end 144 of the riser attachment 28. The indented annular wall 146 is adapted for mating engagement with the annular recess 100 in the upper end 98 of the upper housing 94 of the wall insert reservoir cap 20, as previously described. In a specific embodiment, an inner surface of the indented annular wall 146 may include an annular ridge 148 adapted for mating engagement with an annular groove 150 in the annular recess 100 in the upper housing 94. In a specific embodiment, the fountain apparatus 10 may further include an O-ring 152 adapted to be received in the annular recess 100 in the upper housing 94 and compressed by the indented annular wall 146 on the riser attachment 28 when inserted into engagement with the annular recess 100.

A second end 154 of the riser attachment 28 may be designed with the same structure as the upper end 98 of the upper housing 94 on the wall insert reservoir cap 20. In a specific embodiment, the second end 154 of the riser attachment 28 may include an annular recess 156. In a specific embodiment, the annular recess 156 may include an annular groove 158. In this way, the first end 144 of one riser attachment 28 may engage with the second end 154 of another riser attachment 28 in the same way as described above with respect to the upper end 98 of the upper housing 94 on the wall insert reservoir cap 20. In this manner, multiple riser attachments 28 can be stacked to a desired height for purposes of positioning the stream nozzle tip 30 at a desired location above the pool water surface, which can vary from pool to pool. This forms a stackable tube to transport pressurized water from the water insert reservoir cap 20 upwardly to the stream nozzle tip 30 that is positioned above the water line of the pool 16 to spray water in various patterns over the pool surface. The male and female connecting channel design as described above produces a watertight seal between each component by simply sliding the male portion into the female receiving portion until they click together in mating engagement. In this manner, the design allows for manual connection of the components without the use of any required tools. The homeowner simply pushes the components together until they click into place. It is further noted that the teeth and recess mating connection as described above for the connection between the wall insert 18 and the wall insert reservoir cap 20 may also be employed to connect the various components to form the fountain head assembly.

Lastly, at the top of the vertical tubular structure is the stream nozzle tip 30. As with the riser attachments 28, the stream nozzle tip 30 may be provided with a generally cylindrical body member that has a bend at a desired angle, such as approximately 45 degrees, for example. Alternatively, the stream nozzle tip 30 may be formed in two parts including an angled riser attachment 32 disposed between the top riser attachment 28 and a straight nozzle tip. The stream nozzle tip 30 may have a first end 160 that is structurally the same as the first end 144 of the riser attachment 28, so that the stream nozzle tip 30 can be easily snapped into engagement with the second end 154 of the uppermost riser attachment 28 in whatever series of one or more riser attachments 28 the homeowner has selected. As noted above, in a specific embodiment, there may not be a need to include a riser attachment 28 as part of the fountain apparatus 10. For example, a return jet for a particular pool design may be located close to the water surface, in which case it may not be necessary to extend the stream nozzle tip 30 upwardly through the use of one or more riser attachments 28. In such a situation, the angled riser attachment 32 or the stream nozzle tip 30 may be connected directly to the upper end 98 of the upper housing 94 on the wall insert reservoir cap 20. As mentioned previously, the male and female connecting channel design produces a watertight seal between each component by simply sliding the male portion into the female receiving portion that clicks together. The simplicity of the design is such that no tools are required, and the homeowner simply pushes them together till they click into place. A second end 162 of the stream nozzle tip 30 may be generally cone shaped and provided with one or more exit jet ports 164, such as shown in FIG. 1B. The stream nozzle tip 30 includes an internal fluid flow path therethrough from the first end 144 to the second end 162 of the stream nozzle tip 30.

The purpose of the stream nozzle tip 30 is to capture the pressurized water coming from the stacked riser attachments 28 and spraying water in multiple streams or patterns across the surface of the water. The stream nozzle tip 30 may include a mechanical and physical shape change from a round water tube to a chevron design. The mechanical design change and associated internal moldings, by virtue of a narrowing or pinching of the available space for water flow, has the effect of increasing head pressure at the point of water discharge through the holes/jets. The chevron design works similar to a venturi concept by compressing the pressurized water into a smaller space and increasing the exit pressure at the nozzle face. The streamline design also reduces surface resistance and friction which increases the flow of pressurized water to the discharge end of the stream nozzle tip 30. By increasing the pressure at the exit jets, this improves the efficiency and strength of the exiting streams of water. The invention will produce a stronger stream of water than typical rounded end nozzles while using less water volume. The invention will create longer distance streams of water without the need of increasing the pressurized water system pumps.

In another specific embodiment, the fountain apparatus 10 may include a lighting system. This lighting system may embodied in the stream nozzle tip 30. The source of the lighting can be fiber optics, LEDs or other light emitting devices. The stream nozzle tip 30 may be transparent so as to allow the light emitting source to project through the water as the water streams exit the nozzle, or each jet/orifice can have an independent light color associated with the orifice which can be randomly changed.

In another specific embodiment, the fountain apparatus 10 may include the ability to change the spray direction and pattern of water discharged as a stream simply by rotation of the wall insert reservoir cap 20, rotation of the topmost riser attachment 28, rotation of the angled riser attachment, and/or rotation of the stream nozzle tip 30. All of this is made possible by the surface mating and locking technology discusses in detail above.

An additional benefit of the present inventions is that all adjustments can be accomplished in or out of the pool, which makes projecting the spray of the stream nozzle tip 30 simple and convenient.

Another benefit of the present inventions is temperature control of the water. If the air temperature above the pool is warmer than the water discharged by the fountain, the water falling through the warmer air will be heated before falling into the pool therefore increasing the temperature of the water. Conversely, if the air above the pool is cooler, then the water falling through the air will be cooled thus cooling the pool as the water returns to the surface of the pool. The perfect time to cool the pool is at night and the perfect time to heat the pool is during the heat of the day.

In a specific embodiment, the fountain head assembly may be provided with one or more attachment points for additional devices such as skimmers, pool cleaners, pool toys and other devices.

Now that the various components of the fountain apparatus 10 and the way they interconnect with each other has been described, additional details will now be provided regarding how the design of the fountain apparatus 10 functions to use an incoming stream of pressurized fluid to provide fluid flow to create a fountain over a pool water surface while at the same time maintaining water circulation below the pool water surface through a jet nozzle.

Referring to the lower portion of FIG. 2A, it can be seen than an internal reservoir is defined in a specific embodiment by the first annular space 64 in the wall insert 18 in combination with the second annular space 90 in the wall insert reservoir cap 20. In a specific embodiment, this internal reservoir may also include the passageway 92 that leads upwardly through the upper housing 94 that may be part of the wall insert reservoir cap 20. This internal reservoir uses mechanical technology to create a storage area that ensures adequate water volume to support the fountain spray function without removing too much water from the pressurized system that would render the inlet water jet ineffective.

The wall insert reservoir cap 20 may provide a number of functions. For example, the male connector guide that includes the teeth 102 produces a watertight connection with the female guides or recesses 108 on the wall insert 18. This male and female connecting channel design produces a watertight seal between each component by simply sliding the male portion into the female receiving portion that clicks together. The benefit is that there is no need for a gasket to form a seal between components. By removing the need for a gasket, the life cycle of the gasket as a maintenance item is eliminated.

By mating the wall insert 18 and the wall insert reservoir cap 20 in the manner explained above, the water reservoir holding area is completed. By diverting pressurized water into this mechanically designed area there is an increase in water pressure to drive the fountain spray head.

The top portion of the wall insert reservoir cap 20 provides the exit point for pressurized water from the reservoir to operate the fountain head and includes a connection point, as described above, for attaching the riser attachments 28 used to extend vertically, such as to just below or right above the pool water surface. This design makes it easy to adjust the height requirement between the below water inlet jet and the pool water surface that may differ pool to pool.

The wall insert reservoir cap 20 also gives the homeowner the ability to change the direction of spray by simply rotating the wall insert reservoir cap 20 in a clockwise or counterclockwise direction parallel to the pool wall 14. This rotation is made possible by the circular mating surfaces of the wall insert 18 and the circular mating surface of the wall insert reservoir cap 20 (see above discussion of mating teeth and recesses). By turning/rotating the wall insert reservoir cap 20, the spray nozzle 30 will move in a circular pattern in a 360-degree plane parallel with the pool wall. This rotation will change the position and direction of spray from the fountain apparatus 10. Typical use may be from the pool surface on the left at a 9 o'clock position passing through the 12 o'clock position located at the top of the arc and ending at the 3 o'clock position on the right side of the pool surface. There is little use in spraying under water but that is possible with this design.

The wall insert reservoir cap 20 also provides a horizontal passage (e.g., inner bore 112, inner bore 126, and exit orifice 130 shown at the bottom of FIG. 2A) for the remaining pressurized water to continue to the exit jet portion of the fountain apparatus 10 through the nozzle ball 24. This is a benefit as the functionality of the inlet jet is maintained as designed in the original pool construction.

From the above description, it can be seen that the present inventions may be designed for use in swimming pools in general but are not limited to this sole environment. The fountain effect, water spraying over the surface of the water, may be created by several internal components engineered to capture a portion of the inlet pressurized water to operate the fountain and the remaining pressurized water exiting the front of the apparatus in the same manner and location as designed in the pool installation. Additional attributes of the present inventions may include: (1) simple home owner installation, (2) height adjustment of the spray nozzle above the surface of the water through the addition of "stackable riser sections" to achieve the desired height above the water line, (3) regulation of water pressure at both the fountain head and exit jet via customer installed small hole jet nozzles, (4) variable spray patterns of water above the pool surface by the simple rotation of multiple components of the invention, (5) adding colored light to the fountain streams and (6) convenient removal for storage.

As used herein, the term swimming pool describes in-ground and above-ground pools and spas, or any structure meant to hold water for personal use such as exercise and entertainment. As mentioned earlier, the pressurized water source can be the internal design of the pool circulation/filtration system, or any temporary or permanent pressurized water source attached to the invention. In general, a pressurized water system has a water inlet jet that returns water to the pool and is located below the surface of the water. The placement of this inlet water jet below the surface varies in height from the surface of the water from pool to pool. This creates a need for a system that can adjust to differing height requirements to penetrate the water surface by the spray nozzle of the fountain. The present inventions address these needs as reflected above.

In a specific embodiment, the fountain apparatus may be attached to the pressurized water source located in the pool wall that is attached to an existing inlet water jet. The existing inlet water jet is removed, and the fountain apparatus 10 is attached thru an engineered mechanical component that is part of the present inventions, such as a specific embodiment of the wall insert 18. Once attached, the fountain apparatus 10, through various mechanical components, captures a portion of the pressurized water and diverts it into an internal reservoir. The water then flows upward in the stackable riser attachments 28 and into the stream nozzle tip 30 that produces the fountain effect through various jets located in the face of the stream nozzle tip 30.

The height adjustment from the inlet water jet below the surface, to a point above the water line is managed by "stacking" the riser attachments 28. These riser attachments 28 are attached to each other (stacked) until the overall height from the inlet water jet below the surface, combined with the length of the stacked riser extension, approaches the surface of the water. At that point, the stream nozzle tip 30, either with or without an angled riser attachment 32, is attached to the last riser attachment 28 and penetrates the surface of the water. The stream nozzle tip 30 is attached to the riser attachment 28 to create the general arc design of the sprayed water over the pool surface.

The remaining pressurized water that is not captured and diverted into the reservoir and upwardly to the stream nozzle tip 30 is directed horizontally out the front of the fountain apparatus jet nozzle 24, which may be in the same plane and general location as the original water inlet jet that was removed.

The design and mechanical components of the present inventions create the water source for the fountain portion while maintaining the flow and circulation of water into the pool through the jet nozzle 24 that replicates the design in the original pool build. In this manner, the present inventions provide for a fountain and at the same time a water inlet jet that returns water to the pool based on the original design.

Because pools vary in size and shape, another benefit of the present inventions is the ability to adjust the direction, flow and pattern of the discharged water from the fountain head. The present inventions provide flexibility in spray quantity, direction and pattern of spray to maximize both visual and entertainment use.

Another aspect of the present inventions may include lighting. In a specific embodiment, the spray nozzle 30 may include LED or similar light emitting sources. In a specific embodiment, the fountain apparatus 10 may use LED's or fiber optics to project various colors through the spray nozzle 30, which adds color to the water exiting the fountain nozzle 30. By incorporating this feature, the pool becomes a visually stunning picture of variable colored water streams that are visible in low light conditions increasing the visual appeal of the fountain spray and the pool setting.

Other benefits of the present inventions may include the low cost of the present inventions, the ability of the homeowner to make the installation, the low-profile design, rigid attachment to the pool wall and ease of storage during pool closing.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A fountain apparatus comprising:

a wall insert including a cylindrical body member having a first end and second end, an internal cylindrical housing within the body member, a central fluid flow path extending from the first end of the body member through the internal cylindrical housing to the second end of the body member, and a fluid passageway extending from the central fluid flow path to the second end of the body member through a space defined by an outer surface of the internal cylindrical housing and an inner surface of the body member;

a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert;

a reservoir locking cap having a cylindrical body member having an inner bore, the cylindrical body member of the reservoir locking cap being adapted to be received within the internal bore of the internal cylindrical wall of the wall insert reservoir cap, a first end of the cylindrical body member of the reservoir locking cap being adapted for threadable engagement with the internal cylindrical housing in the wall insert, and the inner bore of the cylindrical body member of the reservoir locking cap in fluid communication with the central fluid flow path in the wall insert;

a jet nozzle ball having an annular body including an internal fluid passageway leading from a first end of the annular body to a second end of the annular body, the first end of the annular body being adapted for engagement within a second end of the cylindrical body member on the reservoir locking cap;

a jet nozzle cap having a central aperture adapted to receive the second end of the annular body on the jet nozzle ball, the jet nozzle cap being adapted for threadable engagement with a second end of the cylindrical body member on the reservoir locking cap; and a stream nozzle tip including an angled body member, the angled body member including an internal fluid flow path therethrough extending from a first end of the angled body member to a second end of the angled body member, the first end of the angled body member being adapted for mating engagement with the upper end of the upper housing on the wall insert reservoir cap, and the angled body member including at least one exit jet port.

2. The fountain apparatus of claim 1, further including at least one riser attachment having a cylindrical body having a longitudinal passageway therethrough, the at least one riser attachment being adapted for connection between the wall insert reservoir cap and the stream nozzle tip, a first end of the at least one riser attachment being adapted for mating engagement with the upper end of the upper housing on the wall insert reservoir cap with the longitudinal passageway through the at least one riser attachment in fluid communication with the second fluid passageway through the wall insert reservoir cap, and a second end of the at least one riser attachment being adapted for mating engagement with the first end of the angled body member.

3. The fountain apparatus of claim 1, further including at least one water port diverter disposed within the cylindrical body member of the wall insert and supported by the internal cylindrical housing in the wall insert.

4. The fountain apparatus of claim 3, wherein the at least one water port diverter includes a ramp surface angled downwardly away from the first end of the cylindrical body member of the wall insert and toward an internal bore of the cylindrical body member of the wall insert.

5. The fountain apparatus of claim 3, wherein the at least one water port diverter includes a U-shaped side wall.

6. The fountain apparatus of claim 1, wherein the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert.

7. The fountain apparatus of claim 1, wherein the upper housing includes an annular recess in the upper end of the upper housing, and wherein an annular wall extending from a first end of the at least one riser attachment is adapted for mating engagement with the annular recess in the upper end of the upper housing.

8. The fountain apparatus of claim 7, wherein an inner surface of the annular wall includes an annular ridge adapted for mating engagement with an annular groove in the annular recess in the upper end of the upper housing.

9. The fountain apparatus of claim 1, wherein the space in the wall insert is an annular space and the space in the wall insert reservoir cap is an annular space and the two annular spaces are aligned with each other when the wall insert is engaged with the wall insert reservoir cap.

10. A fountain apparatus comprising:

a wall insert including a cylindrical body member having a first end and second end, an internal cylindrical housing within the body member, a central fluid flow path extending from the first end of the body member through the internal cylindrical housing to the second end of the body member, and a fluid passageway extending from the central fluid flow path to the second end of the body member through a space defined by an outer surface of the internal cylindrical housing and an inner surface of the body member;

a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert;

a reservoir locking cap having a cylindrical body member having an inner bore, the cylindrical body member of the reservoir locking cap being adapted to be received within the internal bore of the internal cylindrical wall of the wall insert reservoir cap, a first end of the cylindrical body member of the reservoir locking cap being adapted for threadable engagement with the internal cylindrical housing in the wall insert, and the inner bore of the cylindrical body member of the reservoir locking cap in fluid communication with the central fluid flow path in the wall insert;

a jet nozzle ball having an annular body including an internal fluid passageway leading from a first end of the annular body to a second end of the annular body, the first end of the annular body being adapted for engagement within a second end of the cylindrical body member on the reservoir locking cap;

a jet nozzle cap having a central aperture adapted to receive the second end of the annular body on the jet nozzle ball, the jet nozzle cap being adapted for threadable engagement with a second end of the cylindrical body member on the reservoir locking cap;

at least one riser attachment having a cylindrical body having a longitudinal passageway therethrough, a first end of the at least one riser attachment being adapted for mating engagement with the upper end of the upper housing on the wall insert reservoir cap with the longitudinal passageway through the at least one riser attachment in fluid communication with the second fluid passageway through the wall insert reservoir cap; and a stream nozzle tip including an angled body member, the angled body member including an internal fluid flow path therethrough extending from a first end of the angled body member to a second end of the angled body member, the first end of the angled body member being adapted for mating engagement with a second end of the at least one riser attachment, and the angled body member including at least one exit jet port.

11. The fountain apparatus of claim 10, further including at least one water port diverter disposed within the cylindrical body member of the wall insert and supported by the internal cylindrical housing in the wall insert.

12. The fountain apparatus of claim 11, wherein the at least one water port diverter includes a ramp surface angled downwardly away from the first end of the cylindrical body member of the wall insert and toward an internal bore of the cylindrical body member of the wall insert.

13. The fountain apparatus of claim 11, wherein the at least one water port diverter includes a U-shaped side wall.

14. The fountain apparatus of claim 10, wherein the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert.

15. The fountain apparatus of claim 10, wherein the upper housing includes an annular recess in the upper end of the upper housing, and wherein an annular wall extending from a first end of the at least one riser attachment is adapted for mating engagement with the annular recess in the upper end of the upper housing.

16. The fountain apparatus of claim 15, wherein an inner surface of the annular wall includes an annular ridge adapted for mating engagement with an annular groove in the annular recess in the upper end of the upper housing.

17. The fountain apparatus of claim 10, wherein the space in the wall insert is an annular space and the space in the wall insert reservoir cap is an annular space and the two annular spaces are aligned with each other when the wall insert is engaged with the wall insert reservoir cap.

18. A fountain apparatus comprising:

a wall insert including a cylindrical body member having a first end and second end, an outer surface of the first end of the cylindrical body member including male threads, an internal cylindrical housing within the body member, the internal cylindrical housing including a threaded bore, a central fluid flow path extending from the first end of the body member through the internal cylindrical housing to the second end of the body member, a fluid passageway extending from the central fluid flow path to the second end of the body member through a space defined by an outer surface of the internal cylindrical housing and an inner surface of the body member, and at least one water port diverter disposed within the cylindrical body member and supported by the internal cylindrical housing;

a wall insert reservoir cap including an annular body member and an upper housing, the annular body member having an internal cylindrical wall, the internal cylindrical wall having an internal bore, a second fluid passageway extending from a first end of the annular body member through a space between an outer wall of the annular body member and an outer surface of the internal cylindrical wall to an upper end of the upper housing, the first end of the annular body member being releasably engageable with the second end of the cylindrical body member on the wall insert so that the second fluid passageway is in fluid communication with the fluid passageway in the wall insert, and the internal bore of the internal cylindrical wall is aligned with the internal cylindrical housing in the wall insert;

a reservoir locking cap having a cylindrical body member having an inner bore, the cylindrical body member of the reservoir locking cap being adapted to be received within the internal bore of the internal cylindrical wall of the wall insert reservoir cap, a first end of the cylindrical body member of the reservoir locking cap having male threads on an outer surface thereof adapted for threadable engagement with the threaded bore on the internal cylindrical housing in the wall insert, the inner bore of the cylindrical body member of the reservoir locking cap being adapted for alignment with and fluid communication with the central fluid flow path in the wall insert, an outer surface of a second end of the cylindrical body member of the reservoir locking cap including male threads;

a jet nozzle ball having an annular body including an internal fluid passageway leading from a first end of the annular body to a second end of the annular body, the first end of the annular body being adapted for engagement within a second end of the cylindrical body member on the reservoir locking cap;

a jet nozzle cap having a central aperture adapted to receive the second end of the annular body on the jet nozzle ball, the jet nozzle cap including internal female threads adapted for threadable engagement with the male threads on the second end of the cylindrical body member on the reservoir locking cap; and a stream nozzle tip including an angled body member, the angled body member including an internal fluid flow path therethrough extending from a first end of the angled body member to a second end of the angled body member, the first end of the angled body member being adapted for mating engagement with the upper end of the upper housing on the wall insert reservoir cap, and the angled body member including at least one exit jet port.

19. The fountain apparatus of claim 18, wherein the second end of the cylindrical body member of the wall insert includes a plurality of alternating teeth and recesses, and the first end of the annular body member on the wall insert reservoir cap includes a plurality of alternating teeth and recesses, and wherein the teeth on the wall insert are adapted for engagement with the recesses on the wall insert reservoir cap, and the teeth on the wall insert reservoir cap are adapted for engagement with the recesses on the wall insert.

20. The fountain apparatus of claim 18, wherein the space in the wall insert is an annular space and the space in the wall insert reservoir cap is an annular space and the two annular spaces are aligned with each other when the wall insert is engaged with the wall insert reservoir cap.

* * * * *